No. 836,910. PATENTED NOV. 27, 1906.
J. ZERFAS.
ANIMAL CLEAVING MACHINE.
APPLICATION FILED OCT. 2, 1905.
5 SHEETS—SHEET 3.
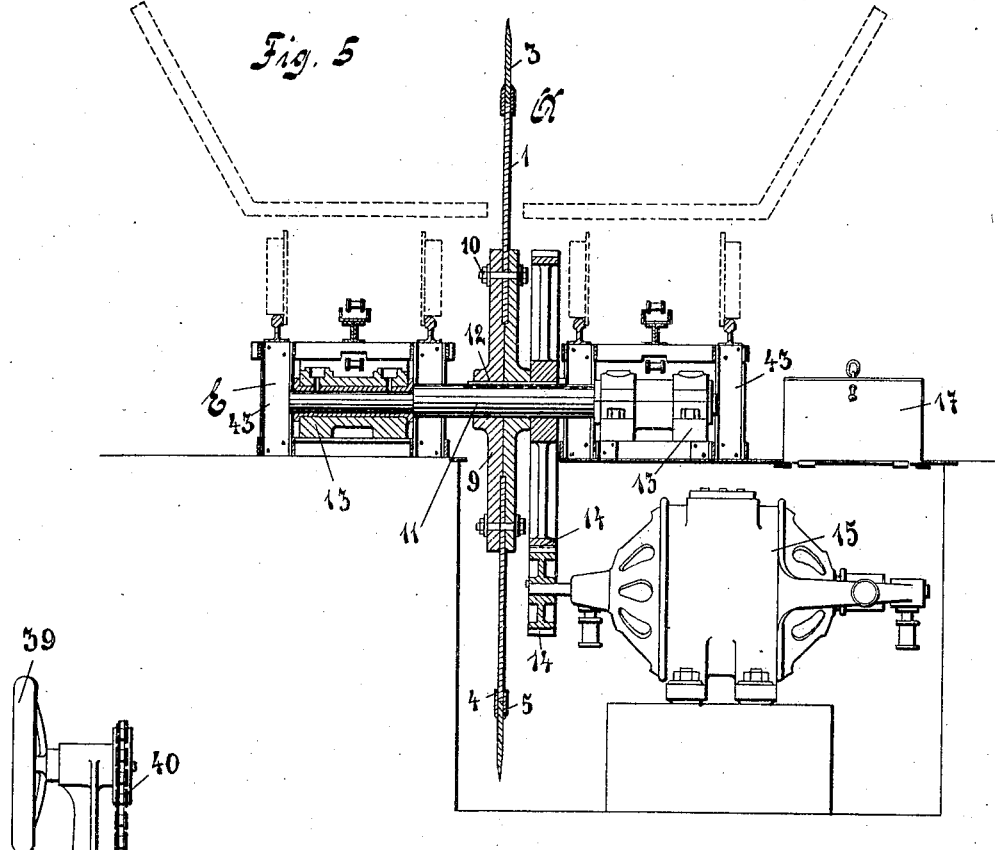
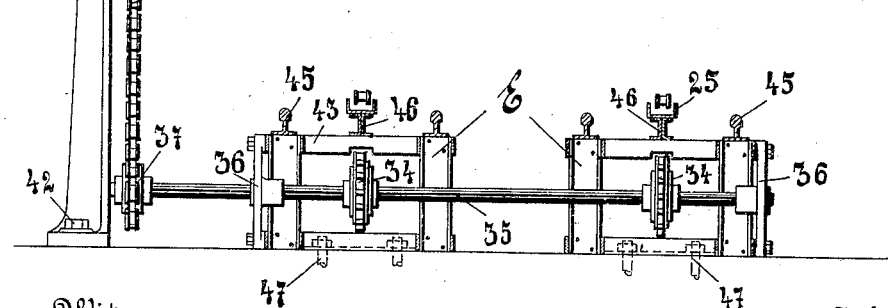

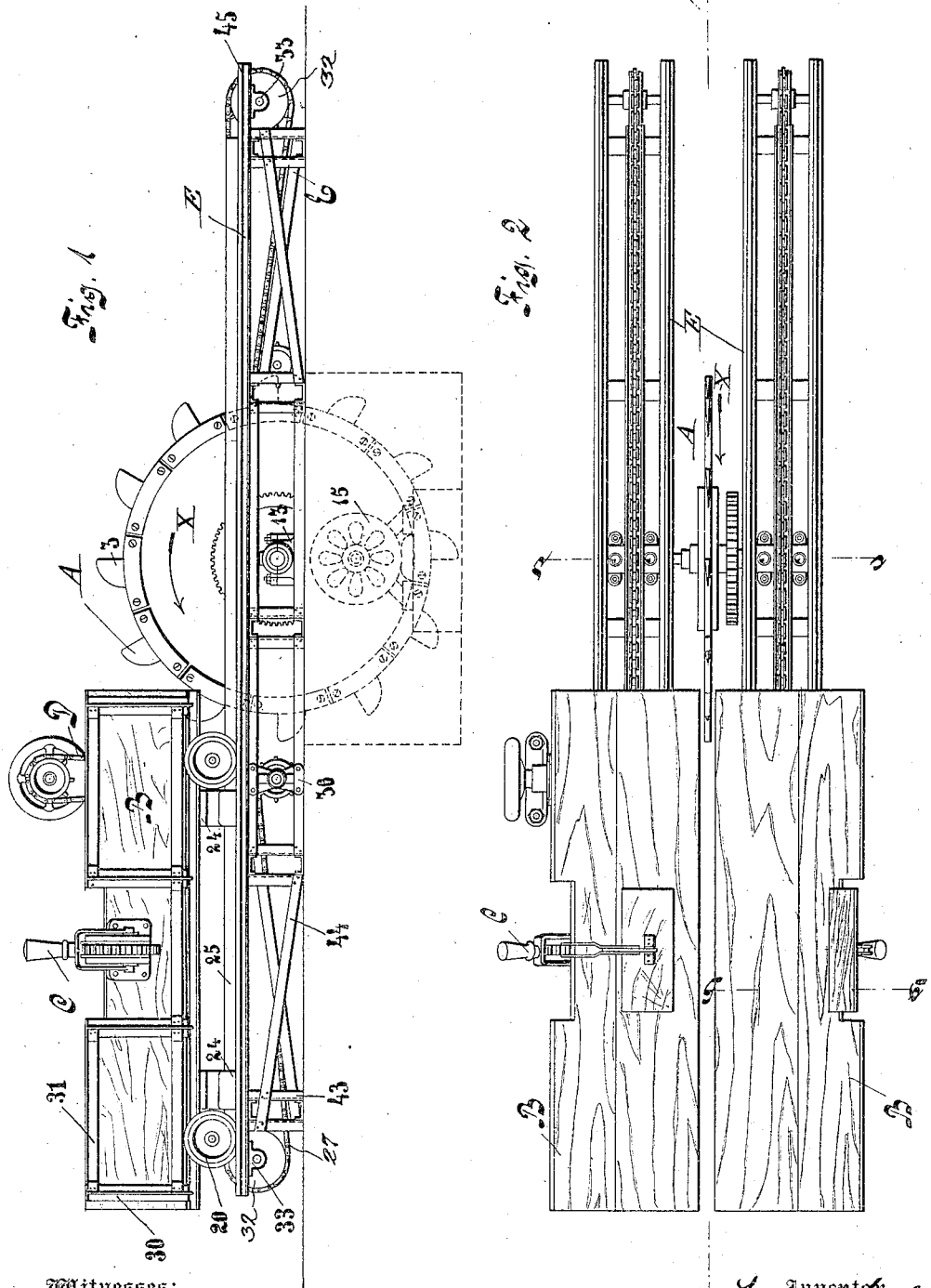

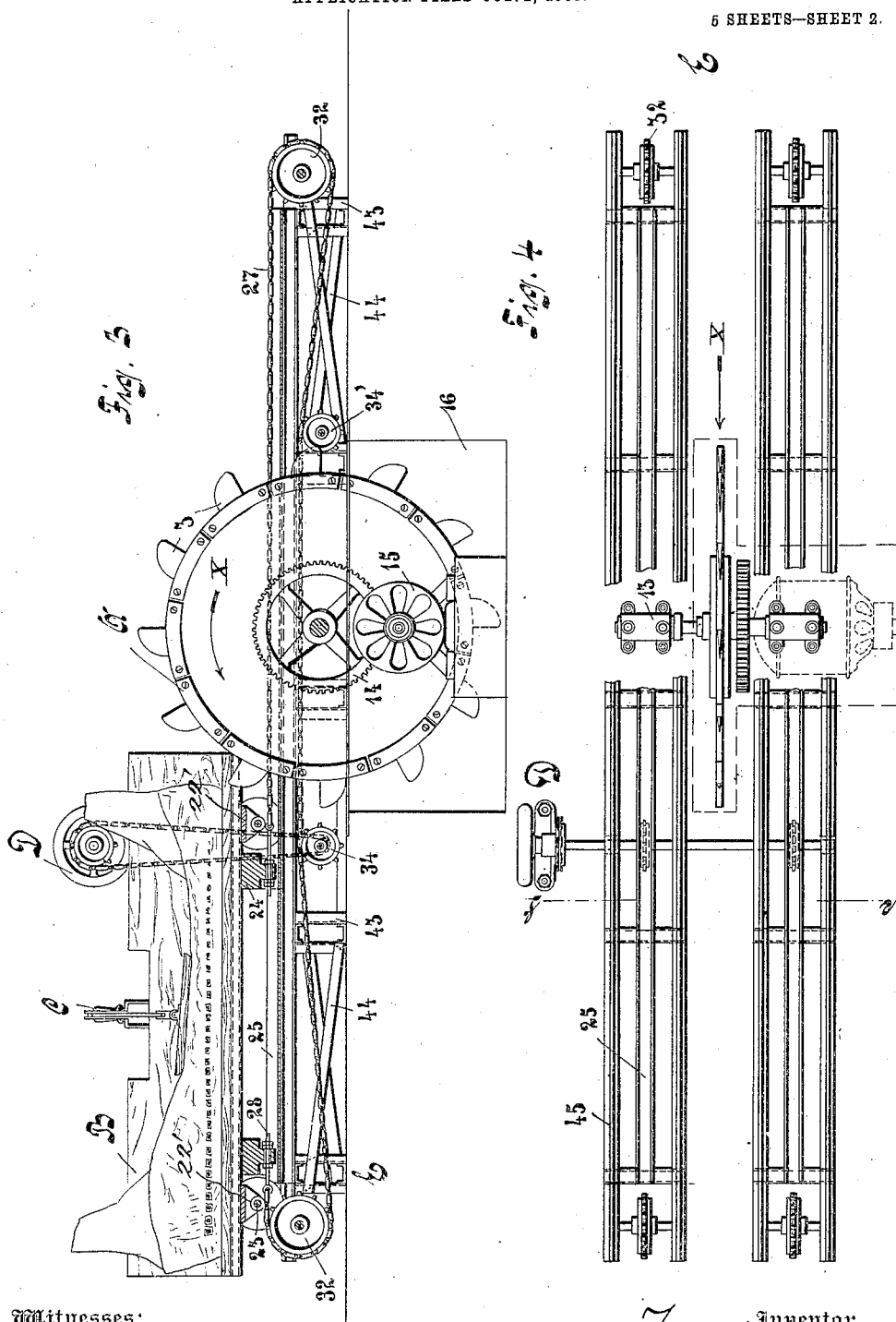

No. 836,910. PATENTED NOV. 27, 1906.
J. ZERFAS.
ANIMAL CLEAVING MACHINE.
APPLICATION FILED OCT. 2, 1905.
5 SHEETS—SHEET 4.
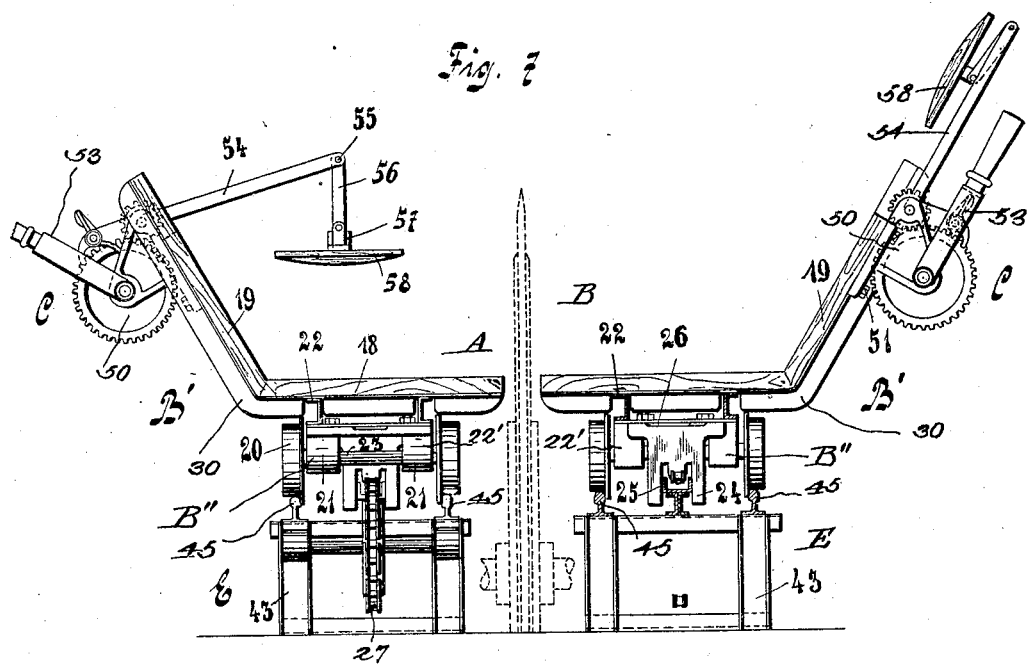
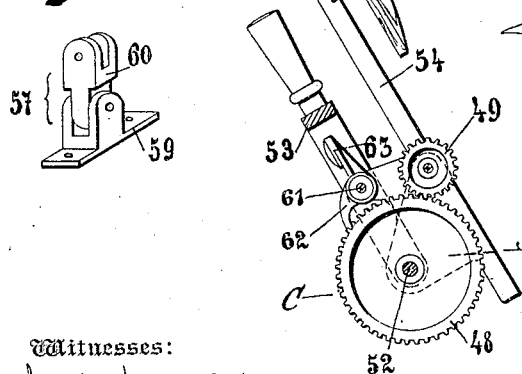
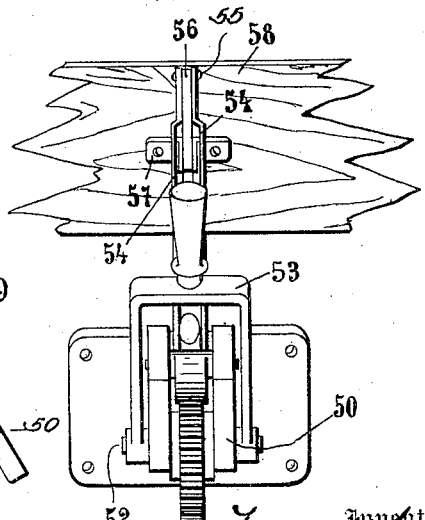
Witnesses:
Inventor
Joseph Zerfas
By his Attorney No. 836,910. PATENTED NOV. 27, 1906.
J. ZERFAS.
ANIMAL CLEAVING MACHINE.
APPLICATION FILED OCT. 2, 1905.
5 SHEETS—SHEET 5.
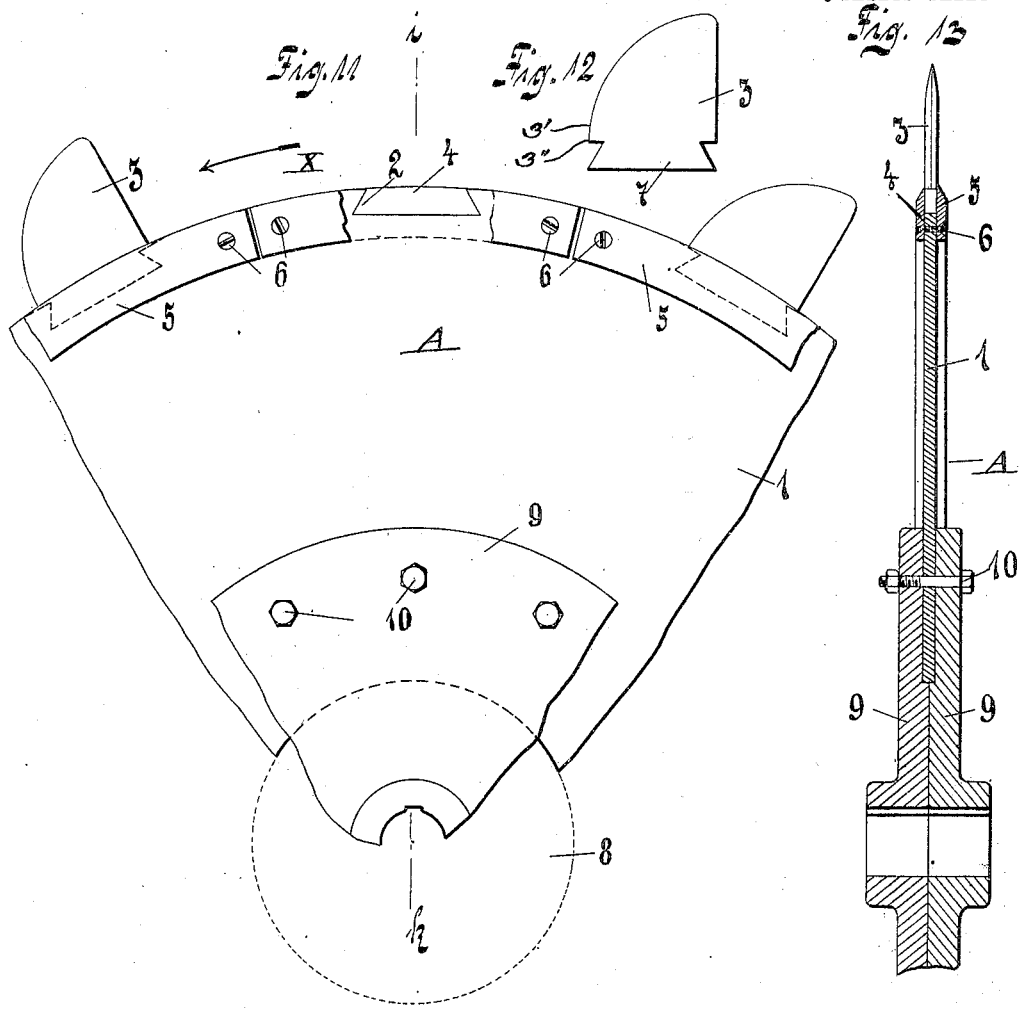

UNITED STATES PATENT OFFICE.

JOSEPH ZERFAS, OF NEW YORK, N. Y.

ANIMAL-CLEAVING MACHINE.

No. 836,910.  Specification of Letters Patent.  Patented Nov. 27, 1906.

Application filed October 2, 1905. Serial No. 280,952.

*To all whom it may concern:*

Be it known that I, JOSEPH ZERFAS, a citizen of the United States, residing in the borough of Manhattan, in the city, county, and State of New York, have invented certain new and useful Improvements in Animal-Cleaving Machines, of which the following is a specification.

This invention relates to a certain new and useful machine which I shall designate, in accordance with the objects it is designed to accomplish, an "animal-cleaving machine."

In order that the objects of my invention may be more readily understood, a brief statement will be had at this point describing generally the character of the work and the manner of performing it for the purpose of which the mechanism herein specified has been invented.

One of the customary steps of the butcher in the process of killing and preparing an animal for market is to cleave or split the body of the slaughtered beast lengthwise in the direction of and through the backbone and the surrounding meat, thereby dividing the body into two parts. Hitherto, so far as I am aware, this operation of cleaving the body of an animal lengthwise, and thus parting it into two pieces, has been performed solely by the human hand, equipped merely with a suitable instrument, such as a cleaver, and without the assistance of machinery or other mechanical agency.

It may be observed here that an essential requirement of the described operation is that the body of the animal must be split lengthwise exactly through the backbone in a line substantially straight.

To provide in place of the human agent a machine or mechanism by means of which the foregoing-described manipulation of cleaving the body of a beast may be accomplished in a manner at once quicker, better, and more economically is the principal object of this invention.

A further object is generally to cleave or split bones surrounded by meat.

I attain these objects by the mechanism described in detail in connection with the accompanying drawings, representing a practical embodiment of my invention, in which—

Figure 1 is a side elevation of a machine embodying my invention. Fig. 2 is a top plan view thereof. Fig. 3 is a vertical longitudinal section, the section being taken on a line $a\,b$ in Fig. 2, with a vertical longitudinal section of the body of an animal in the position the body should occupy during the operation. Fig. 4 is a top plan view of the machine as it appears after the removal of the animal-carrying apparatus B, showing also the bearings 13 of the rotary cleaver A. Fig. 5 is a cross-section of the rotary cleaver, the section being taken on the line $e\,d$ in Fig. 2. Fig. 6 is a sectional view, the section being taken on a line $e\,f$ in Fig. 4 and shows the mechanism for operating the table, the said table being removed. Fig. 7 is an end view of the table, partly in section, in which the right-hand view represents a cross on line $g\,h$ in Fig. 2 and the left-hand part illustrates an end view of the respective separate trucks comprising the table B and in which also the clamping devices C are shown, the right-hand view representing the clamping device in an open, and the left-hand view in a closed, position. Fig. 8 shows in detail the clamping device C, partly in section. Fig. 9 is a front view of said clamping device. Fig. 10 is a perspective view of the universal joint to which the clamping-plate is attached. Fig. 11 is an enlarged fragmentary view of the rotary cleaver, showing in detail the manner of securing the cutting-blades. Fig. 12 shows the shape and form of the cutting-blades as used in the rotary cleaver. Fig. 13 is a vertical cross-section of the rotary cleaver, the section being taken on a line $i\,k$ in Fig. 11. Fig. 14 is a sectional detail view of the guide-fork, also the means for adjusting the operating-chain for the table; and Fig. 15 is a front view of the guide-fork.

Similar reference characters refer to corresponding parts in the several views.

Referring to the accompanying drawings, Fig. 1, A indicates as an entirety a severing device, which I term a "cleaver," and from Figs. 5, 11, 12, and 13 it will be seen that the cleaver A is composed of a disk 1, which is provided in its periphery with a desired number of dovetail openings 2. The cutting elements of the cleaver A comprise the cleaver-blades 3 3, &c., which at their lower ends are dovetailed to correspond with the openings 2 of the disk 1. To hold the blades 3 in place, I fasten upon one side of the disk 1 and against the said blades segments 4 and to the opposite side of the said disk the segments 5, each of said blades being independently secured by the said segments and the segments being held by the screws 6 6, as shown in Fig. 13.

It will be seen that the blades 3 have a curved cutting edge 3', which starts from the base 3'' and gradually recedes from the direction of rotation of the blades 3, which is indicated by the arrow X, Fig. 11. The object of this form of edge is to draw the blades through the flesh in conjunction with the force of contact due to rotation, thus giving the effect of a knife, which is important to the proper working of my device.

To support the disk 1, I secure the same by means of the bolts 10 between the flanges 9 9, (see Fig. 13,) the flanges being held by a key 12 on the shaft 11. (See Fig. 5.) The shaft 11 is rotatably supported by the frame E in bearings 13. Any desired means may be employed to operate the shaft 11, such as hand-power, belt, or friction; but I preferably gear the same to an electric motor 15, which I prefer to place underground out of the way, access to which can be had through a door 17.

Fig. 5 illustrates the manner in which the cleaver A is operated. In order to bring a carcass up to the cleaver and retain it in contact therewith, I employ a traveling table B, Figs. 1, 2, and 7, which is composed of the two secondary carriages or sections B' B', which are in turn mounted upon individual trucks B'' B'', each of which are provided with wheels 20. The carriages are composed of a floor 18 and angularly-disposed side walls 19, the said carriages being placed sufficiently apart to freely permit the passage therebetween of the cleaver A, as shown in Fig. 7. To the under side of the floor 18 are secured hangers 22', which rotatably support the axles 23 of the wheels 20, the hangers being fastened to the channel-irons 22 by means of the bars 26, to which the floor 18 is fastened. Under the trucks B'' B'' a channel or guide rail 25 is placed, (see Figs. 14 and 15,) which in turn is partly embraced by forks 24, carried by the trucks 20, the forks 24 preventing any side lashing of the trucks. This is important for the reason that the center of the carcass which the table B carries must be kept in alinement with the cleaver A.

For operating the table I employ a sprocket-chain 27, which is fastened to the forks 24 by means of the adjustable bolt 28, take-up nuts 29 being employed to adjust the chain. The table B is provided with two of these forks 24, one at each end, (see Fig. 3,) each of said forks having a bolt 28 attached thereto, and consequently the chain 27 is not continuous. If desired, a rope drive or a rack-and-pinion drive may be used. The table B, which comprises the two sections hereinbefore referred to, is preferably made of wood to prevent any chemical action from contact with the carcass. The sections of the table are reinforced by the bars 30 and 31. (See Figs. 1 and 7.) The driving-chain 27 passes over, at each end of the frame E, an idler 32, which is rotatably supported by bearings 33, Fig. 1. For driving the chain 27 I employ a manually-operable mechanism D, which comprises sprocket-wheels 34, adapted to engage the said chain, mounted upon a shaft 35, which in turn is rotatably supported by bearings 36, attached to the frame E, an idle sprocket 34' being provided to prevent the chain from sagging. Shaft 35 is also provided with an operating sprocket-wheel 37, which has engaged therewith a sprocket-chain 38, a support 41 being provided which at its upper end carries a hand-wheel 39 and a sprocket-pinion 40, which engages and operates the chain 38. The support 41 is anchored by the bolts 42. It will be seen that when the wheel 40 is rotated the table B can be moved in the desired direction through the mechanism described.

The supporting element for the table B and upon which the trucks B'' B'' run comprises the hereinbefore-mentioned frame E, which is composed of two distinct structures. The component members of the frame E are the supports 43, of suitable design, and are stiffened by the braces 44. Upon the frame E rails 45 are mounted, upon which the wheels 20 of the trucks B'' B'' run. (See Fig. 3.) In the center of the frame a guide rail or channel 25 is mounted, in which the operating-chain 27 runs. The frame E is anchored by the bolts 47.

In order to firmly clamp a carcass in position upon the table B, I employ a specially-designed adjustable clamp C, (see Figs. 7, 8, and 9,) comprising the pinion 48, having in mesh therewith a gear 49, both being rotatively supported by a bracket 50, which is mounted upon the members B' B' of the table B, bolts 51 being employed to secure the bracket 50 in place. Attached to the pinion 48 is a shaft 52, which extends beyond the bracket 50, as shown, and has connected thereto a forked operating-lever 53, (see Figs. 8 and 9,) by which the pinion 48 is rotated. The gear 49 has rigidly attached thereto side bars 54, which form an arm. The side bars 54 will move with the rotation of the gear 49. A bolt 55 passes through the bars 54 at the upper end, a swinging bar 56 being loosely supported by said bolt. The lower end of the swinging arm 56 carries a universal joint 57, comprising the members 59 and 60, and is of well-known construction. A clamp-plate 58 is carried by the said universal joint 57 and is attached to the member 59 thereof. The presence of the universal joint 57 permits the plate 58 to adjust itself to the contour of the carcass, and any desired pressure can be applied thereto through the medium of the gear and pinion 48 and 49 by means of the lever 53. In order to retain the pressure upon the carcass, I employ a pawl 62, which is carried by the bracket 50 and is adapted to engage the teeth of the pinion 48. A handle 63 is provided to force the pawl out of engagement with the teeth of the pinion when desired.

The operation, briefly, is as follows: The cleaver having been started, a carcass is clamped upon the table B by means of the clamp C. The table by means of the mechanism D is carried toward the cleaver, and a continued movement serves to cause the cleaver to sever the carcass in obvious manner.

Having now described my invention, what I claim, and desire to secure by Letters Patent, is—

1. In an animal-cleaving machine, the combination of a table adapted to receive a carcass, an adjustable clamping device carried by said table, and comprising a manually-operable pinion having meshed therewith a gear provided with an arm, said arm being provided at its upper end with a swinging arm having a universal joint at its lower extremity, a clamp-plate carried by said universal joint, and a pawl adapted to engage the teeth of said pinion, together with a rotary cleaver adapted to sever a carcass carried by said table.

2. In an animal-cleaving machine the combination of a rotary cleaver, a framework having two separate tracks mounted thereon, a carrying apparatus for travel upon said tracks, consisting of two separate trucks B'', each of which has an upper part 18, a side wall 19, hangers 21 carrying the wheels 20, channel-irons 22 supporting upper part 18 and fastened to hangers 21, shafts 23 passing through said hangers, all substantially as shown.

3. In an animal-cleaving machine the combination of the clamp-plate 58, the pinion 48, the gear 49, the support 50, the lever 53, the shaft 52, two arms 54 secured rigidly to pinion 49, a bolt 55 firmly connecting said arms at the upper end thereof, an arm 56 mounted loosely on bolt 55, a universal joint 57 consisting of the lower part 59 and the upper part 60, adapted to permit a free movement of the clamp-plate 58, all substantially as set forth and for the purpose specified.

4. In an animal-cleaving machine the combination of a framework, two separate tracks mounted thereon, a carrying apparatus adapted to travel on said tracks, said apparatus consisting of two separate trucks, each having guide-forks attached to its under side, a sprocket-chain, bolts securing the chain to the guide-forks, means for regulating the tension of the chain, sprocket-wheels at each end of the framework, bearings supporting said sprocket-wheels, idle sprockets adapted to keep said chain from sagging, an operating mechanism adapted to set the chain in motion and effect the forward and backward travel of carrying apparatus on the tracks, and an adjustable clamping device, comprising a manually-operable pinion having meshed therewith a gear provided with an arm, said arm provided at its upper end with a swinging arm having a universal joint at its lower extremity, a clamp-plate carried by said universal joint, and a pawl adapted to engage the teeth of said pinion, together with a rotary cleaver adapted to sever a carcass.

In testimony whereof I have signed my name to this specification in the presence of two subscribing witnesses.

JOSEPH ZERFAS.

Witnesses:
 WILLIAM J. STEIN,
 JOSEF AMON.